United States Patent [19]
Hoover

[11] 3,930,296
[45] Jan. 6, 1976

[54] METHOD AND MACHINE FOR LOADING AND ASSEMBLING FILM CARTRIDGES

[75] Inventor: James E. Hoover, Binghamton, N.Y.

[73] Assignee: GAF Corporation, New York, N.Y.

[22] Filed: July 26, 1974

[21] Appl. No.: 491,994

[52] U.S. Cl. ............. 29/430; 29/208 D; 29/211 D; 242/71.1; 242/71.2
[51] Int. Cl.² ........................................ B21D 39/03
[58] Field of Search .......... 29/200 R, 200 B, 200 A, 29/208 R, 208 D, 211 R, 211 D, 429, 430, 431, 464, 467, 468, 469; 242/71, 71.1, 71.2, 55; 53/37, 266, 281, 381 A

[56] References Cited
UNITED STATES PATENTS

| | | | |
|---|---|---|---|
| 3,138,081 | 6/1964 | Nerwin | 242/71.2 |
| 3,226,816 | 1/1966 | Wilson et al. | 29/430 |
| 3,325,889 | 6/1967 | Melt et al. | 29/430 |
| 3,364,552 | 1/1968 | Napor et al. | 29/208 D |
| 3,457,627 | 7/1969 | Napor et al. | 29/430 |
| 3,708,860 | 1/1973 | Bolster et al. | 29/430 |
| 3,742,586 | 7/1973 | Butler et al. | 29/430 |
| 3,748,715 | 7/1973 | Hoover et al. | 29/211 D |
| 3,768,133 | 10/1973 | Scappator et al. | 29/208 E |
| 3,787,954 | 1/1974 | Gade et al. | 29/430 |

Primary Examiner—C. W. Lanham
Assistant Examiner—James R. Duzan
Attorney, Agent, or Firm—Walter C. Kehm; Arthur Dresner

[57] ABSTRACT

The invention is directed to a method of and machine for loading a scroll of film and take-up spool into a cartridge and assembling and sealing the cartridge. It includes the steps of supplying a web of film and backing paper to a scrolling mechanism and winding the webs into a scroll. A single guide track guides and assists in advancing the webs of film and backing paper to a winding spindle. Severing mechanisms are located along the guide track to cut the webs into the desired lengths. The winding spindle is engaged by the webs for scrolling within a socket on a first transport carrier. When scrolling is complete the spindle is withdrawn and the scroll is retained in the socket. An ultrasonic securing device is used to secure a free end of the scroll to a take-up spool carried in another socket of the carrier. A transfer mechanism then transfers the spool and scroll from the first carrier into the chambers of a waiting cartridge bottom carried on a further transport carrier device which transports the loaded cartridge bottom to a station where the cartridge cover is placed on the bottom portion. An ultrasonic welding mechanism then seals the cover to the bottom completing the cartridge.

41 Claims, 8 Drawing Figures

METHOD AND MACHINE FOR LOADING AND ASSEMBLING FILM CARTRIDGES

BACKGROUND OF THE INVENTION

The present invention relates generally to the field of film winding and packaging devices and techniques, and more specifically, to a machine and method for winding film into a scroll and loading it with a film take-up spool into an empty film cartridge such as commonly used in photographic still cameras.

Cartridges of the type assembled by the present invention have been developed and in wide spread use for some time necessitating the need for high speed mass production of fully loaded and assembled cartridges for mass distribution and sale to the public. The cartridge generally comprises a bottom portion having a double chamber for receiving and housing the scrolled film and take-up spool and a cover assembled with the bottom portion and sealed thereto. The scroll of film is generally wound with a layer of protective paper usually provided with appropriate indicia or markings so as to determine discrete lengths of film. The film and paper are appropriately connected to the take-up spool for film advancing and winding during the picture taking procedures. The take-up spool, cartridge cover and bottom receiving portion are preferably made of a plastic material.

Cartridges of the foregoing type have been designed so as to facilitate picture taking by the amateur or inexperienced photographer. Improper loading or insertion of the cartridge into the camera has been avoided by designing the cartridge with one end thereof of a different size or shape than the other so that insertion into a properly designed camera can be made in only one way. Further, these cartridges have eliminated the necessity for rewinding film such as is common in the more sophisticated 35 mm type cameras and have further eliminated the possibility of loosely wound or unraveling rolls of film. Accordingly, the cartridge and cartridge loading cameras have become vastly popular and widely used.

Aa variety of techniques and machines have been designed and developed in an attempt to efficiently and rapidly load and assemble such cartridges. Such prior machines and techniques have involved a series of complicated procedures and steps of assembly requiring a number of operators and have involved complicated machinery for handling and conveying the various components of the cartridge to appropriate assembly and sealing stations. Several guide tracks have usually been employed to separately advance the paper, film and cartridge elements to an assembly or operating position.

One such prior technique of loading and assembling requires the step of preassembling the double chambered bottom portion with the cover prior to loading, transporting the assembled but unsealed cartridge to a loading station, employing means to remove the cover and inserting a scroll of film and take-up spool into their respective chambers in the bottom portion of the cartridge. It has been found that preassembly and consequent removal of the cover is an unnecessary step in the assembly operation requiring additional structure for the assembly apparatus further complicating the machinery and requiring possible additional operators.

The winding or scrolling of the film with backing paper has typically been accomplished by wrapping the film about a driven spindle. Difficulties have been encountered in the prior known apparatus and techniques for accurately and rapidly securing the free end of a strip of film and backing paper to the spindle without causing jam-ups in the machine operation.

Prior art techniques have also involved the taping or otherwise securing the sensitized film to the backing paper which is ultimately interleaved between the wound film so as to properly register discrete lengths of film with indicia or marking on the backing paper for use by the photographer during the picture taking operation. It has been found that this also is an unnecessary step further requiring additional complicating structure.

It is accordingly one object of the present invention to provide a machine or apparatus for efficiently, rapidly and accurately loading and assembling film cartridges of the foregoing type for mass distribution.

A further object of the present invention is to provide a method and apparatus for loading and assembling film cartridges which avoid complications of the prior techniques and machines eliminating unnecessary steps and simplifying machinery and equipment.

It is yet another object of the present invention to avoid difficulties in winding the film and paper about a spindle encountered by prior known devices and to provide an apparatus which rapidly and accurately winds the film and paper into a scroll for insertion in the cartridge in a virtually trouble free manner.

A further object of the present invention is to provide a semi-automatic cartridge loading system of improved reliability minimizing supervision and numbers of operators required.

Yet another object of the present invention is to provide an apparatus facilitating complete winding and scrolling operation of the film, insertion thereof into a hollow cartridge along with an attached take-up spool, assembly of the hollow cartridge with a cover, sealing the cover to the cartridge and delivery of a completed, sealed and loaded cartridge ready for labeling and packaging.

The above objects, features and advantages along with other objects, features and advantages of the present invention will become more apparent from the detailed description of the invention in conjunction with the accompanying drawings to be described more fully hereinafter.

SUMMARY OF THE INVENTION

The above objects and advantages are generally accomplished by providing a cartridge loading and assembly apparatus for conducting six main operations. The first operation advances the film from a supply into an enclosed supply guide together with a pre-notched backing paper, severs the film and paper to desired lengths and scrolls the film and paper. The second operation transfers the scrolled film and paper to a turret having scroll and spool receiving sockets. In practice, however, the scroll is formed within one of the scroll sockets, so that no additional transfer operation is required. A third operation secures a free end of the paper to the take-up spool. A fourth operation transfers the scroll and take-up spool into a waiting cartridge bottom. A fifth operation seals the cover of the cartridge to the loaded bottom. The sixth operation ejects the cartridge from the apparatus to a receiving bin.

More specifically, the method of the invention includes supplying a web of sensitized film and a web of backing paper in overlying and registered relation to a scrolling station; severing said webs of film and paper to desired finite lengths; winding said film and backing paper into a scroll; attaching a free end of scrolled paper to a take-up spool; inserting said scroll and take-up spool simultaneously into a scroll chamber and spool chamber of said bottom portion; assembling said bottom portion with said cover to form the cartridge assembly enclosing said spool and scroll within said chambers; and sealing said cover to said bottom portion in a light-tight manner.

The present invention further provides an apparatus or machine for carrying out the foregoing method which includes a housing, a supply of sensitized film and a supply of backing paper; a single guide track supported on said housing for receiving and transporting therein a web of film with a web of backing paper to a scrolling means; means for guiding a web of film from the supply thereof into said guide track, and means for guiding a web of backing paper from the supply thereof into said guide track; means supported on said housing for engaging said web of film and means for engaging said web of paper to advance said webs along said guide track; means for severing said film and paper webs to desired finite lengths; means for determining relative locations of said webs to actuate said severing means; scrolling means carried on said housing at one end of said guide track for winding said severed webs into a scroll; means for attaching a free end of said scroll to a take-up spool; means for simultaneously inserting said spool and scroll into a spool chamber and a scroll chamber respectively in said bottom portion of said cartridge; transport means for carrying said loaded bottom portion to an assembly station for assembly with said cover; and means for sealing said cover to said bottom portion to form a completed cartridge.

BRIEF DESCRIPTION OF THE DRAWINGS

There follows a detailed description of a preferred embodiment of the invention to be read together with the accompanying drawings wherein.

DESCRIPTION OF THE INVENTION

Figure 1:
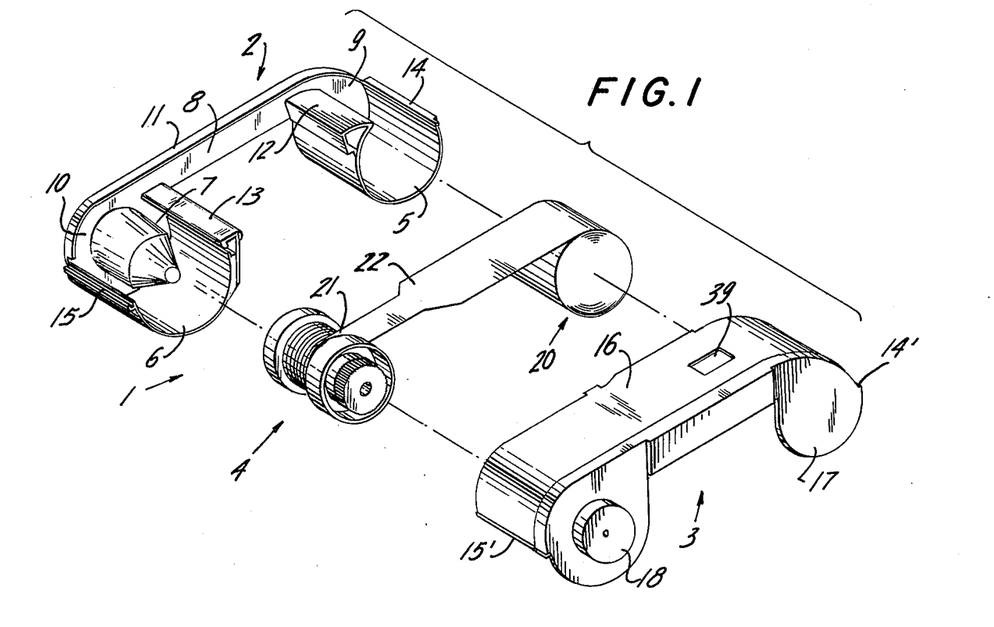
FIG. 1 is an exploded perspective view showing the various elements of the known cartridge to be assembled according to the present invention.

Referring now in greater detail to the accompanying drawings, FIG. 1 shows in an exploded view the various components of the cartridge to be loaded and assembled by the present invention. Neither the cartridge itself nor any of its component parts from any part of the present invention as it is widely used and well known, but are described herein in order to provide full appreciation and understanding of the loading and assembly thereof by the present invention to be described more fully hereinafter.

The cartridge, generally referred to as 1, comprises a bottom portion 2, a cover 3, a take-up spool 4 and a scroll 20 of film and backing paper.

The bottom portion 2 comprises two chambers or compartments 5 and 6, respectively. Chamber 5 is intended as a film supply chamber and will receive the scroll of film and backing paper. Chamber 6 is a take-up chamber intended to receive spool 4 to which the film and paper will be attached and ultimately wound onto during picture taking operations. When the respective chambers are filled with the film scroll and take-up spool cover 3 will be assembled with the bottom portion 2 so as to totally enclose the chambers and form the completed cartridge. Spool 4 is freely rotatably carried on a tapered spindle 7 formed integrally with the bottom portion 2 within the chamber 6. A wall 8 extends between and connects chambers 5 and 6 and is integral with back walls 9 and 10 which define a portion of chambers 5 and 6, respectively. A lip 11 extends along the upper edge of wall 8 protruding perpendicular to the plane of wall 8. Ledges 12 and 13 define film guide surfaces providing passageways for the film between chambers 5 and 6 and serve as light locks to prevent undesirable film exposure.

The bottom portion 2 further includes guideways 14 and 15 for receiving complimentarily fitting guide members 14' and 15' on the cover 3. The cover further includes a top wall 16 intended to cover or enclose the film to be transported over ledges 12 and 13. An aperture 39 is provided in top wall 16 to provide means for viewing indicia printed on the backing paper. End walls 17 and 18 will enclose chambers 5 and 6, respectively, when the cover is assembled and sealed to the bottom portion 2. Upon assembly and sealing, the bottom portion 2 and cover 3 combine to form the cartridge which carries a roll of film and backing paper in supply chamber 5 with an end thereof attached to take-up spool 4 housed within take-up chamber 6.

The free end 21 of backing paper from scroll 20 is attached to the spool by a known ultrasonic attaching technique. When fully assembled the scroll 20 will be accommodated within chamber 5 of the bottom portion 2 of the cartridge and spool 4 will be accommodated within the chamber 6. Portion 22 of the paper will extend between chambers 5 and 6 and be guided on ledges 12 and 13. The present invention which will be described in detail comprises the apparatus and technique of forming the scroll 20 of film and backing paper, attaching a free end 21 of the paper to a spool 4, loading the scroll and spool into chambers 5 and 6 of the cartridge and light-tight securing the cover 3 onto the bottom portion 2 of the cartridge forming a completed cartridge assembly.

Figure 2:
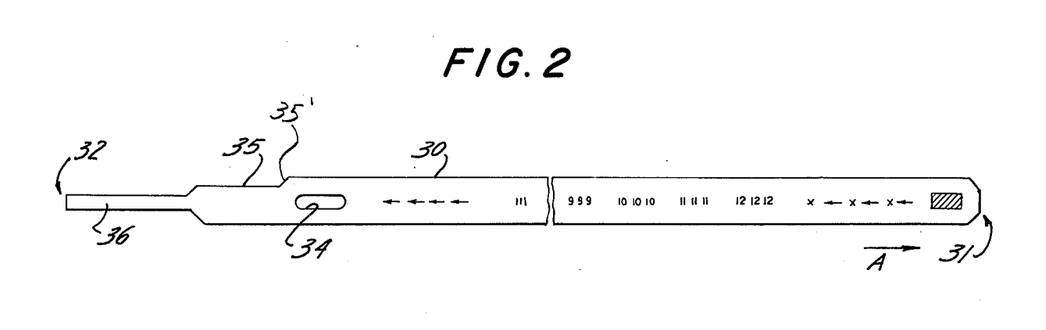
FIG. 2 is a plan view of the backing paper to be scrolled with the film.

FIG. 2 is a plan view showing a length of backing paper to be used with the film for loading in the cartridge. The paper is pre-notched with a plurality of notches and slots for use as indicators to initiate or terminate various operations in advancing and severing the paper to a scrolling station. The paper is advanced in the direction of the arrow A during the operation. The paper has a first end 31 which will be located at the center of the scroll when wound with the film and forms the rear end of the paper scroll during the picture taking operations. A second end 32 forms the free end of the paper to be attached to the spool 4 at 21. Detecting means on the apparatus, to be described hereinafter, determine the presence of the notch 35 to initiate various operations for scrolling. The beginning of notch 35 at 35' is used as an indicator to initiate slow speed scrolling. This is followed by stopping the scrolling operation and initiation of a severing operation at the end of the leader 36 forming the free end of the paper. Slot 34 is used for viewing therethrough to determine if an end of the film is visible so as to be properly registered with the paper. The paper also carries preprinted indicia for use in the picture taking operations.

Figure 3:
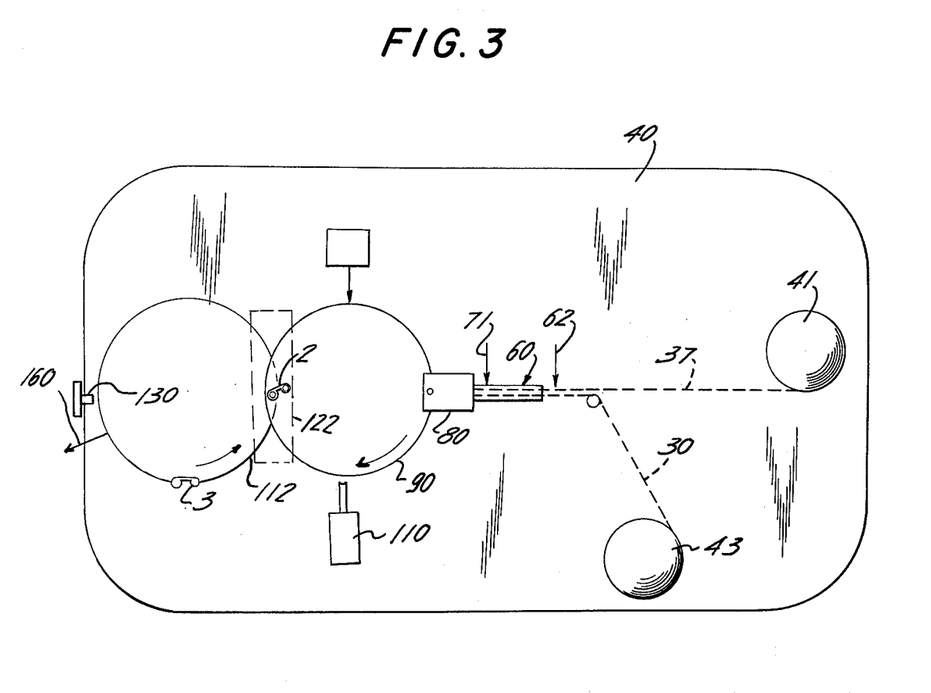
FIG. 3 is a schematic representation of all the stages of operation of the present invention.

The general assembly for the present invention and the various operations to be preformed in assembling the cartridge are shown in schematic form in FIG. 3. A housing 40 supports a supply of sensitized film 41 which serves to provide a web of film 37 which is fed to a guide track indicated generally as numeral 60. A backing paper supply 43 provides the web of paper 30 also fed to the guide track 60 so that the film and backing paper are simultaneously transported to a scrolling station 80. Severing mechanisms 62 and 71 serve to cut the film and paper into the desired lengths for scrolling. The scroll 20 is formed at the station 80 and deposited in a transport carrier mechanism 90 where it is secured to a spool 4 by a securing device 110, which is either manually or automatically supplied to the transport carrier mechanism 90. After the scroll and spool are appropriately joined they are transferred from the transport carrier device 90, by a transfer mechanism 122, into an open bottom portion 2 of the cartridge. The loaded cartridge bottom is then transported on a further transport carrier device 112 to a station where cover 3 is either manually or automatically positioned into the bottom portion 2 of the cartridge so as to complete the assembly. The completed cartridge assembly is then transported to a position where the cover is welded by a known ultrasonic welding mechanism 130 to the bottom portion 2. From here the completed cartridge is further transported to an ejection station 160 where it is removed from the transport device 112 to a receiving bin.

Figure 4:
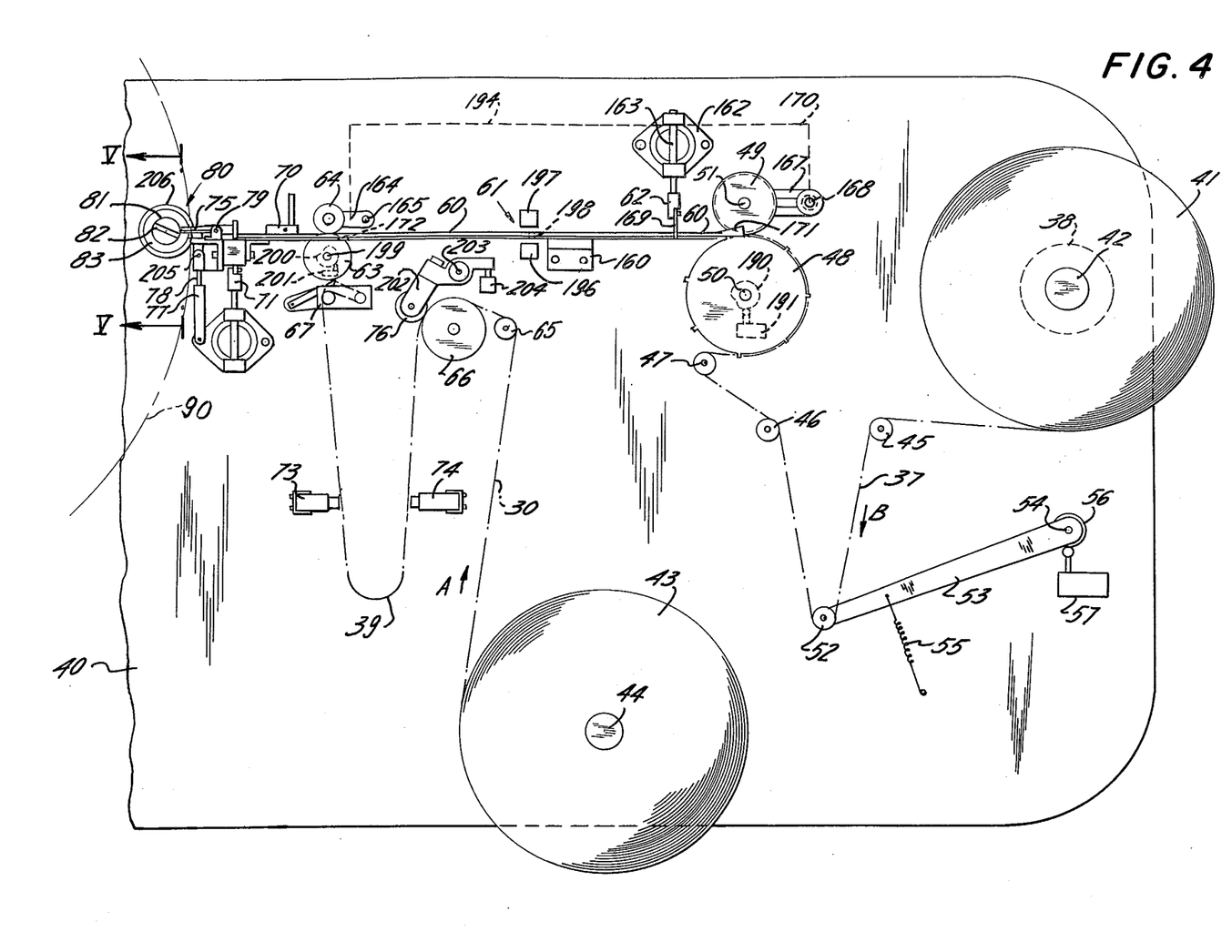
FIG. 4 is an elevational view showing one portion of the present invention for advancing the paper and film to a scrolling station.

Turning now to FIG. 4, the film and paper supply and advancing means to the scrolling station are shown. The film supply comprises a roll of film 41 supported on a shaft 42 journalled for rotation on the housing 40. The paper supply is carried on a roll 43 supported on shaft 44 journalled for rotation on the housing 40. The backing paper supplied from roll 43 is pre-notched into the form shown in FIG. 2, but is not severed into finite lengths such as the length shown in FIG. 2, i.e., end 32 of one length of paper is attached to end 31 of the next succeeding length of paper. The paper 30 to be supplied for scrolling from roll 43 travels in the direction of arrow A. The film 37 being unwound from roll 41 travels in the direction of arrow B. The film 37 is guided over rollers 45, 52, 46 and 47 into a nip formed between a sprocket wheel 48 rotatably driven for a single revolution (to advance a single length of film) on shaft 50 journalled in the housing 40 and a drive roller 40 driven on shaft 51. Shaft 51 is journalled in a pivotably mounted arm 167 carried on a pivot 168. At the end of each revolution of sprocket wheel 48, arm 167 is pivoted about pivot 168 in a clockwise direction over a short distance to lift roller 49 out of contact with wheel 48. Drive roller 49 has a resilient outer covering such as a rubber covered surface. Guide rollers 45, 46 and 47 are arranged in fixed position on the housing for free rotation. Roller 52 is carried on a lever 53 pivotable about pin 54 for maintaining proper tension in the film web 37. Lever 53 is spring loaded so as to be biased in a direction for applying tension to the film web such as by spring 55 or other convenient means. Lever 53 carries a cam 56 for actuating a limit switch 57 for controlling an electrical circuit which operates a brake 38 about shaft 42 to allow free rotation of the film roll 41. Should the tension in the web of film 37 become too great, lever 53 and cam 56 will rotate in a clockwise direction to a point which will cause operation of microswitch 57 so that the brake is released to alleviate tension in the web. If the tension in the web is not great enough spring 55 will cause lever 53 to rotate in a counterclockwise direction about pivot 54 so as to produce proper tension.

Wheel 48 is provided with sprockets for engaging sprocket holes in the film so as to provide accurate metering of the film through the nip between rollers 48 and 49.

An enclosed guide track 60 is supported on the housing 40 by means such as brackets 160 for receiving the film web after it passes through the nip between rollers 48 and 49. A funnel 171 provides a wide receiving means communicating with guide channel 60. The guide track 60 serves to guide the film web to the scrolling station 80 where the scrolling operation is performed.

Upon completion of a single revolution of sprocket wheel 48 a desired length of film will have been fed into guide channel 60. A cam 190 carried on shaft 50 operates limit switch 191 which will be activated upon one complete revolution of shaft 50 (and sprocket wheel 48) to electrically activate severing mechanism 62 carried on the housing by bracket 162 to cut the film so that the desired length rests in the guide track 60. A cutting edge 169 is carried on a shaft 163. When activated, edge 169 cooperates with an edge on track 60 to cut the film. Shaft 163 is connected to a mechanical linkage 170. Upon the return stroke of shaft 163 of the severing mechanism 62, linkage 170 will operate to momentarily lift pivot arm 167 so as to lift roller 49 out of engagement with sprocket wheel 48. Another cam and limit switch on shaft 50 will operate to control the drive of roller 49. Another mechanical linkage 194 connects with an arm 164 carrying roller 64 so as to simultaneously pivot arm 164 about pin 165 in a counterclockwise direction so as to drop roller 64 into contact with roller 63 for further operations to be described.

A detecting element 61, comprising a light source 196 under the guide track 60 and a light sensitive element 197 on top of the guide track, for passing light through a hole 198 in the track, detects the passage of the trailing end of the cut film metered into track 60 when it passes hole 198. When element 197 receives light from the light source it will produce an electrical signal used to operate means (not shown) to lift roller 64 in order to allow the previously cut and metered film to be freely drawn out of the guide track by the scrolling mechanism thereby providing additional room in the track for the next metered length, and to energize the drive for roller 49 to feed the next length of film into the guide track.

Paper 30 is guided about rollers 65 and 66 so as to form a free loop 39. A guide and snubbing device 67 mounted on the housing 40 guides the paper 30 about roller 63 into a nip formed between roller 63 and pinch roller 64. Roller 63 is carried on shaft 199 and is driven so as to draw the paper into the nip and supply it into guide track 60 through an opening 172 in the bottom surface of track 60 in underlying relation to the film web 37 already supplied to the guide track. Roller 64 is carried on lever 164 which is pivotable about pivot 165. When scrolling begins roller 63 will be caused to rotate to advance the paper and film a sufficient distance to the scrolling mechanism. A cam 200 on shaft 199 operates microswitch 201 which will activate air cylinder 87 (see FIG. 5) to insert scrolling spindle 81 into scrolling position, and will also activate scrolling motor 88 to operate at scrolling speed. This will draw paper and film through the guide channel which will cause the end of the film to pass detecting element 61 and initiate the previously described operations.

A light emitting element 73 is supported on the housing for producing a beam of light which is detected by light detecting element 74. Under ordinary operating conditions the beam of light is broken by paper web 30 in the loop 39. When the loop 39 becomes shortened by feed to the scroll mechanism, the light beam will be detected by element 74 to restore the loop. When the light detecting element 74 sees the light from the emitting element 73, indicating a shortened loop, an electrical signal is produced to drive a clutch for operating roller 66 so as to draw paper through the nip between rollers 76 and 66 for supplying additional paper to restore the loop. Roller 76 is carried on bracket 202 which is supported on pivot pin 203 so as to be spring loaded at 204 to maintain roller 76 in contact with roller 66. The loop 39 is required in order to prevent unnecessary tension on the leader portion 36 of the paper 30 at the beginning of each new cycle and to provide constant winding tension throughout the roll.

A light emitting and detecting element 70 is carried on the housing for directing light onto a reflecting surface portion of guide track 60. When the beginning 35' of notch 35 in paper web 30 passes the light emitting and detecting element 70 light will pass through the notch onto the reflecting surface of the guide track and be returned to the element for producing an electrical signal which will cause slow-down operation of the scrolling motor 88 (FIG. 5) at the scrolling station 80. When the end of notch 35 passes the element 70 a further signal will be produced for initiating operation of severing element 71 which will operate to cut the paper at end 32. The structure and operation of element 71 is similar to that of severing element 62. A cam operated by the return stroke of the severing element 71 will operate a further limit switch which produces a signal to actuate air cylinder 87 to withdraw spindle 81 as the scrolling operation will now be complete leaving a short length of paper 36 between the spindle and the severing mechanism 71 unwound for attachment to the spool.

Figure 5:
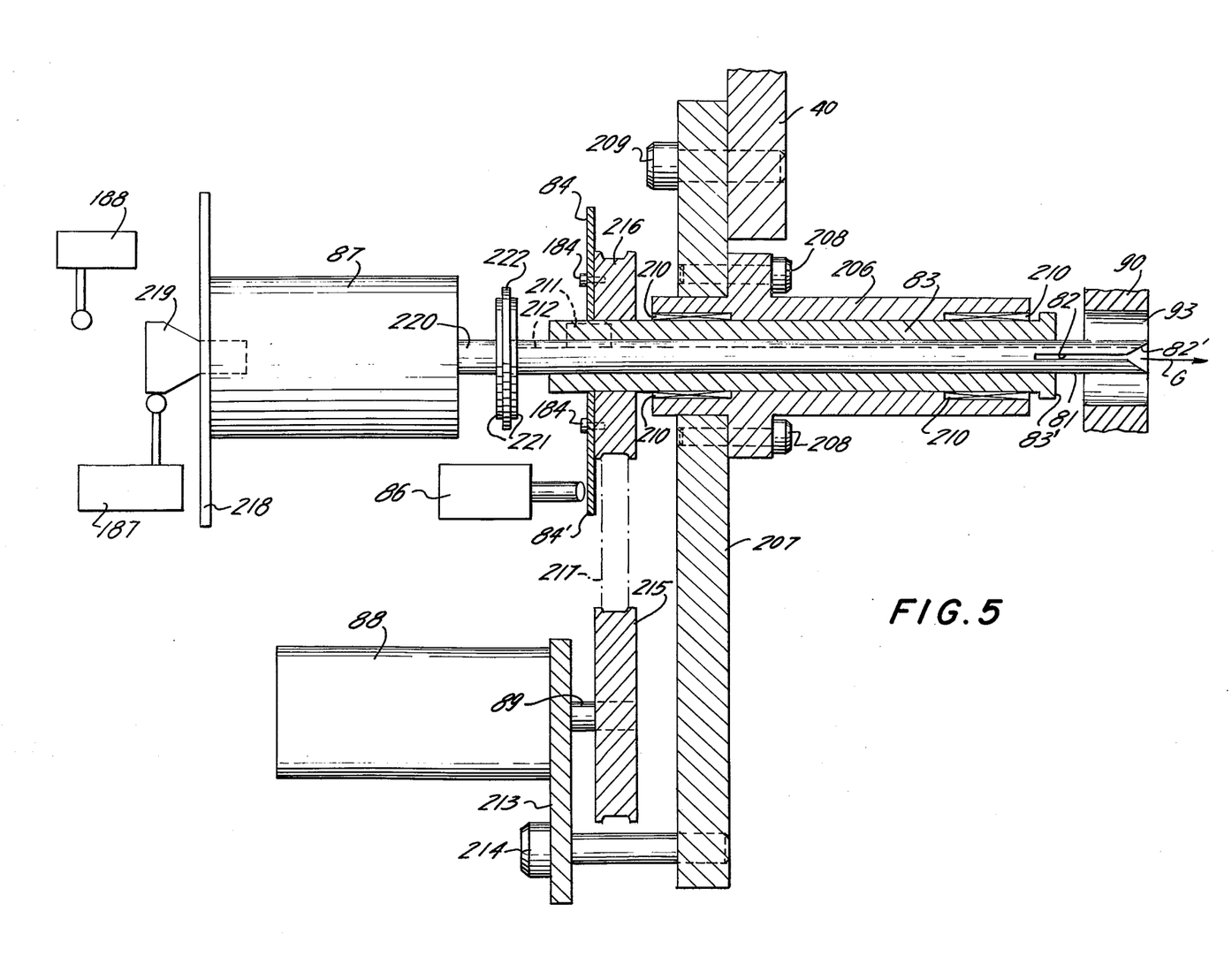
FIG. 5 is a sectional view along lines V — V of FIG. 4 showing the scrolling mechanism.

The operation of the spindle and scrolling will be described more fully with reference to FIG. 5.

In order to ensure trouble free scrolling and to rapidly initiate the scrolling operation, an end of the paper web 30 is inserted into a slot 82 on the scrolling spindle 81. To facilitate insertion into the slot guide track 60 is provided with a portion 75 hinged to the main portion of the track at hinge 79. An air cylinder 77 with piston 78 attached to the underside of hinged guide track portion 75 at 205 is provided beneath the guide track so as to lift the guide track portion 75 about its hinge in order to aim the end of the paper web 30 into the slot 82 in scroll spindle 81. As seen in FIG. 5 spindle 81 is supported in a quill 83 which is journalled for rotation in quill housing 206 supported on bracket 207 as by bolts 208. The bracket 207 is carried on main housing 40 and attached thereto by bolts 209. The quill 83 is supported in the quill housing 206 by bearings 210. Spindle 81 is keyed to the quill 83 for rotation therewith by key element 211. Spindle 81 is provided with a key-way slot 212 so that the spindle may be moved in an axial direction through the quill and yet be caused to rotate with the quill when the quill is rotated in the housing 206. Rotation of the quill and spindle is controlled by motor 88. Motor 88 may be carried on a bracket 213 which may also be supported by bracket 207 as by bolt 214. Motor 88 has an output shaft 89 for carrying a first pulley 215. A second pulley 216 is secured to quill 83 and a belt 217 is supported between pulleys 215 and 216 for driving the pulley 216 and quill 83. Consequently, when motor 88 is energized output shaft 89 will cause driver pulley 215 to rotate thus driving pulley 216 through belt 217 resulting in consequent rotation of quill 83 and spindle 81 keyed thereto. Scrolling operation is thus accomplished by rotating spindle 81 at a scrolling speed by motor 88.

Figure 5A:
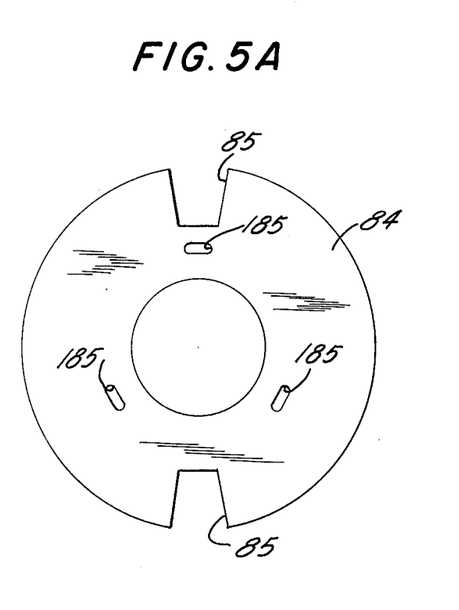
FIG. 5a shows a plan view an element of the scrolling mechanism shown in FIG. 5.

In order to orient the slot 82 into a position for receiving the paper 30 aimed thereat, a spindle plate 84 is secured to the pulley 216 by bolt 184 through slots 185 (see FIG. 5a). Thus, when the spindle and quill are rotated by the motor 88 spindle plate 84 will be rotated therewith. Spindle plate 84 is provided with a pair of slots 85 (see FIG. 5a). A light emitting and detecting element 86 is supported and positioned so that a beam of light will be directed onto the backside 84' of the spindle plate 84. When a prior scrolling operation is complete motor 88 will continue to operate at slow speed causing continued rotation of plate 84. Such continued rotation will continue as long as a beam of light emitted from the element 86 is reflected from the backside of the plate 84 and received by a detecting portion of the element 86. When, however, one of the slots 85 passes the beam of light from the element 86 no reflection will be received by the element and a signal will be produced by the element 86 to terminate slow speed operation of motor 88. At this point the slot 82 will be oriented in the proper position to receive the paper 30 from the hinged portion 75 of the guide track. Since the slot 82 is diametric there are two possible positions for receiving the paper and hence, two slots 85 are provided on the plate 84. Slot 82 has tapered sides 82' in order to provide increased guideway for receiving the paper web 30.

Axial movement of spindle 81 for positioning the spindle into and out of a scrolling position is controlled by air cylinder 87. Air cylinder 87 will be actuated to extend spindle 81 in a direction of arrow G upon a signal received from the transport carrier 90 (to be described more fully hereinafter) when the carrier is in position for receiving the spindle for the next scrolling operation. The transport carrier 90 is provided with scroll receiving socket 93 to be described more fully with reference to FIG. 6. When the carrier 90 is moved to an appropriate position so that socket 93 is aligned with the spindle the air cylinder will be actuated and spindle 81 extended into the socket for receiving an end of the paper 30 to begin scrolling. Air cylinder 87 may be carried on a bracket 218. The air cylinder 87 is provided with an actuator 219 on the rear side thereof so that when the spindle is fully extended (the position shown in FIG. 5) actuator 219 will engage limit switch 187 which is electrically connected to motor 88 so as to initiate high speed operation thereof for rotating the spindle at scrolling speed for a scrolling operation. An interlock switch 188 is also provided so that when the spindle 81 is in its fully extended position the interlock switch will break an electrical circuit to prevent further movement of the transport carrier 90 during the scrolling operation so as to prevent interference with the extended spindle 81. Interlock switch 188 will be deactivated by actuator 219 when the spindle is withdrawn from its scrolling position within socket 93 so that the carrier 90 will be allowed to be indexed and moved to the next position. Air cylinder 87 carries a piston 220 and a coupling 221 attached thereto. A coupling plate 222 is carried at the end of spindle 81 so that axial movement of the spindle can be effected through coupling 221, 222 without interfering with rotation of the spindle 81. This is accomplished by allowing coupling element 222 to rotate within the coupling 221.

When the paper and film are fully wound onto the spindle into the desired scroll within socket 93 the air cylinder 87 will be actuated to withdraw spindle 81 from the socket 93 thus causing the scroll to engage front face 83' of quill 83 and be retained within the socket 93 while spindle 81 is completely withdrawn. After the spindle has been withdrawn carrier (turret) 90 is indexed so as to position scroll receiving socket 99 (see FIG. 6) in alignment with spindle 81 for the next scrolling operation. Simultaneously, socket 93 has been advanced to the position indicated at 95 for the next operation, i.e., attachment of the free end of 32 of the wound paper to the spool 4 contained in socket 94 by ultrasonic attaching means.

Figure 6:
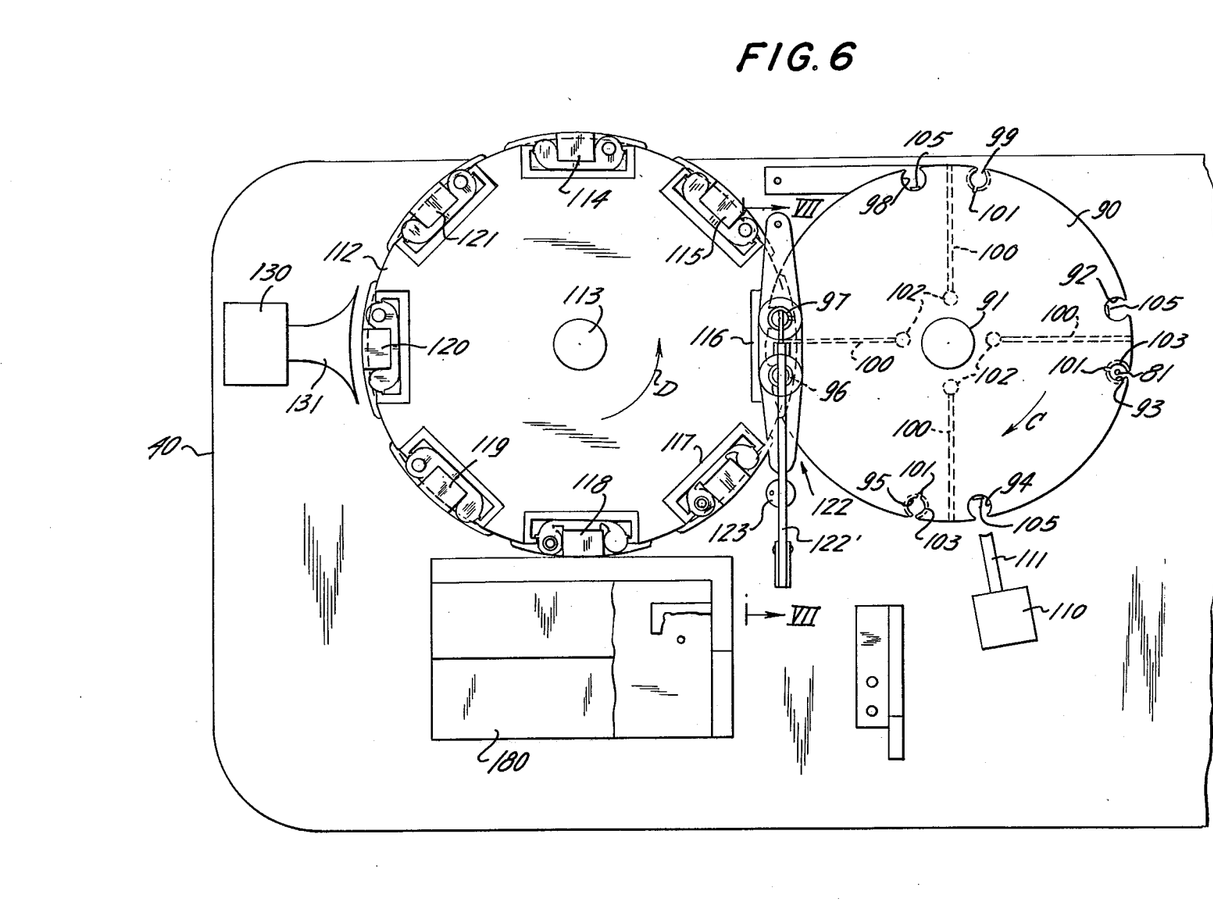
FIG. 6 is an elevational view showing a further portion of the invention for loading and transporting the cartridges.

As previously noted, and with reference to FIG. 6 of the drawings, the transport carrier is formed by a scroll receiving turret 90 mounted for indexing rotation on a shaft 91 of a Ferguson drive indexing mechanism. The turret 90 is provided with four sets of spool and scroll receiving sockets 92, 93; 94, 95; 96, 97; and 98,99, respectively.

Conduits 100 within the turret 90 communicate with a connection 102 leading to a vacuum source. The conduits 100 open at the surface of the turret between spool and scroll sockets 92, and 93, 94 and 95, 96 and 97 and 98 and 99.

After the backing paper and film have been formed into a scroll within socket 93 a trailing end thereof, of a length equal to the distance between the scroll and spool sockets, will extend outside of the scroll socket for attachment to the spool carried in the spool socket 92. Vacuum lines 100 serve to hold such trailing end to the surface of the turret in order to facilitate the attachment operation.

When the scrolling operation is initiated, the spindle 81 will be extended into the scroll receiving socket 93 by air cylinder 87 as previously described where the spindle will be rotated at high speed to form the scroll of film and interleaved paper. After the scroll is formed the spindle is withdrawn and the scroll is retained within the socket 93 as previously described. A spool 4 is manually, or by other feed means, inserted into the spool receiving socket when it is in the position of socket 98. A spring loaded or resiliently mounted pin 105 extends into spool sockets 92, 94, 96 and 98. Pins 105 serve to retain a spool 4 carried in the spool socket. After appropriate indexing of the turret and rotation 90° thereof a spool will be located in the socket show at 92 when scrolling is taking place in socket 93. Further rotation of the scroll turret in the direction of arrow C and indexing another 90°, a scroll will be located in socket 95 and a spool will be located in socket 94 with a length of backing paper 22 extending therebetween. A device 110 for securing by ultrasonic means, is automatically actuated by cam means operated by the indexing drive so that horn 111 engages and ultrasonically secures an end 32 of the paper to the spool. Further rotation and indexing of the turret will bring us to a position where a scroll is carried in socket 97 with a free end thereof attached to a spool carried within spool socket 96. The cam means for initiating insertion of the scroll spindle 81, operation of mechanism 110, and other operations tied to the indexing position of turret 90 is formed by a series of cams carried on a commercially available (such as GEMCO) cam switching unit requiring only cam settings to be tied to the position of the turret.

Turret 112 (cartridge carrying transport device) is supported on a shaft 113 of another Ferguson drive and indexing mechanism for rotation and indexing in the direction of arrow D simultaneously with indexing of the scroll receiving turret 90. Turret 112 is offset from (behind) turret 90. While scroll receiving turret 90 comprises four receiving stations and four index positions, cartridge turret 112 contains eight cartridge receiving sockets 114 through 121 and has eight index positions. A bottom portion 2 of a cartridge is manually inserted or other wise fed and loaded into socket 118 from loading platform 180 when the turret is in the position shown in FIG. 6. Simultaneously, a scroll and spool are loaded into another bottom portion of a cartridge carried in socket 116, which will be registered with sockets 96 and 97 of turret 90, by the transfer mechanism 122 to be described more fully hereinafter. When the spool is to be transferred from the spool socket, pin 105 is withdrawn by cam means within the turret to allow free passage of the spool out of its socket. At the same time a cartridge cover 3 is manually fixed or otherwise fed in position over bottom portion 2 of the loaded cartridge in socket 114 after indexing of the turret 112. An ultrasonic welding mechanism 130 with horn 131 is energized by one of the series of cams tied to the index drive to weld the cover ultrasonically to the bottom portion 2. When the welded cartridge reaches the position of socket 119 an ejecting mechanism, such as an actuated air cylinder, (shown schematically as 160 in FIG. 3) is energized to eject the cartridge axially out of its socket into a waiting supply bin. Successive operations are performed on further indexing of the turret.

Synchronous indexing of turrets 90 and 112 is accomplished by mechanical tying of their respective Ferguson drives. Operation of the welding and securing devices as well as actuation of the transfer mechanism is initiated and synchronized with indexing by the unit of the commercially available cam series such as from GEMCO. Each indexing cycle to a new position is initiated by an operator by energizing an electric clutch to drive an input shaft of the Ferguson drive units. The drive units will be thus caused to complete a single revolution. A new paper and film feed cycle is then automatically initiated by the GEMCO cam switching unit rotated with the Ferguson drive so that it also makes a single revolution.

Figure 7:
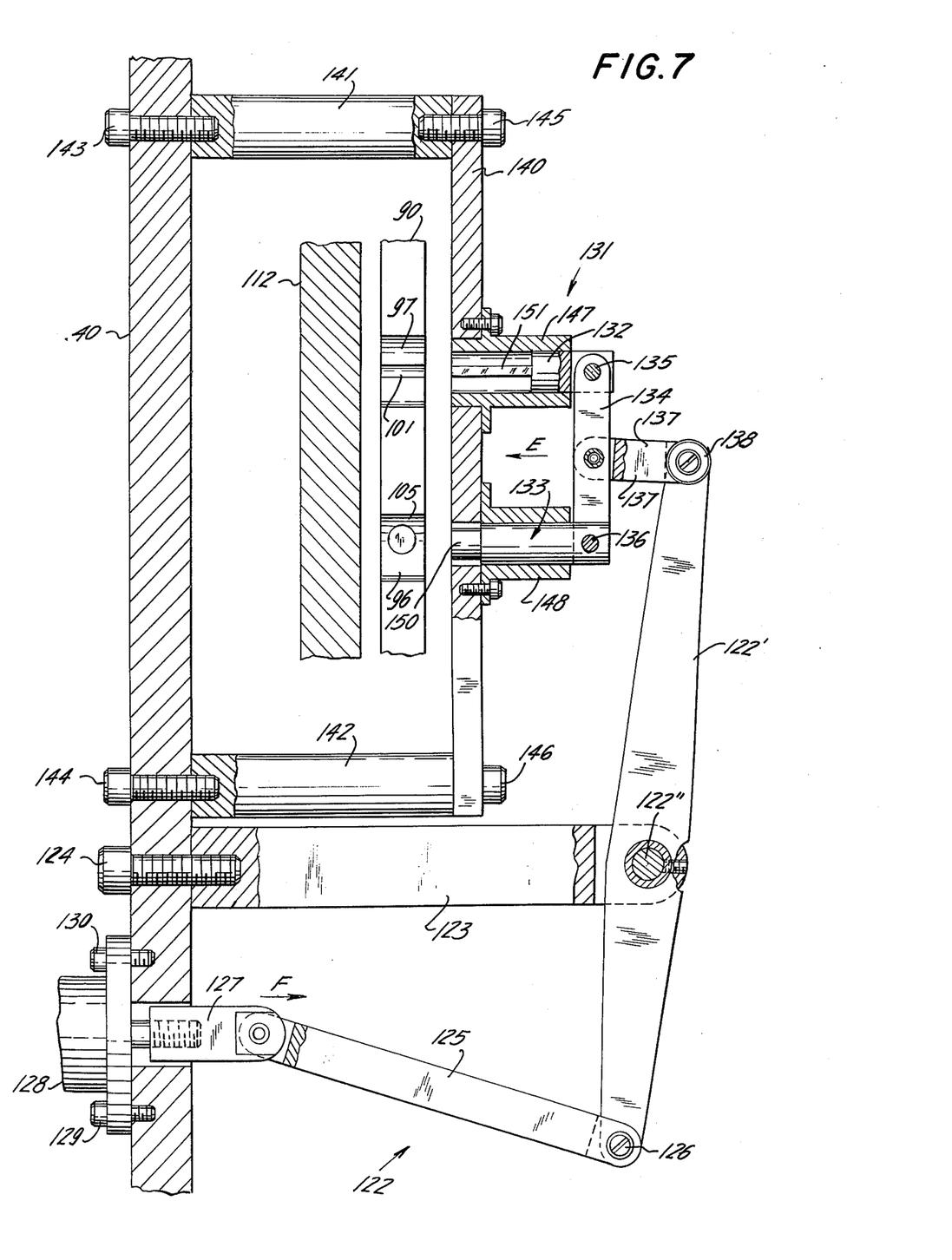
FIG. 7 is a sectional view taken along lines VII — VII of FIG. 6 showing the mechanism for loading the scroll and spool into an open cartridge bottom.

FIG. 7 shows a partial elevation and sectional view of the transfer mechanism 122 in greater detail. Scroll turret 90 is shown as being offset and in front of cartridge turret 122. The scroll socket 97 and spool socket 96 of turret 90 are shown in the position for transferring a scroll and spool (not shown) therefrom into the bottom portion of the cartridge carried in socket 116 of the cartridge turret. The transfer mechanism includes a lever 122' pivotable about pin 122" carried on pivot arm 123 secured to the housing 40 as by bolt 124. A rod 125 is pivotably connected at one end thereof by pin 126 to one end of lever 122'. Rod 125 is connected at its other end to a piston 127 of an air cylinder 128. The air cylinder is secured to the housing 40 as by bolts 129 and 130.

The other end of transfer lever 122' is connected to a substantially U-shaped assembly 131 which includes a first transfer piston 132, for transferring a scroll from the scroll socket 97, aand a second transfer piston 133 for transferring a spool from the spool socket 96. Pistons 132 and 133 are carried on a cross bar 134 and secured thereto by pivot pins 135 and 136, respectively. Lever 137 supports the U-shaped assembly to the lever 122' at pin 138. A guide bracket 140 includes columns 141 and 142 secured to the housing 40 such as by bolts 143 and 144, respectively. Guide bracket 140 is secured to the columns 141 and 142 by bolts 145 and 146. Cylinders 147 and 148 are secured to the guide bracket 140 for providing guideways for pistons 132 and 133, respectively. A slot is provided in each cylinder to allow passage of crossbar 134. Piston 133 has a necked-down portion 150 which engages the spool carried in socket 96, and piston 132 has a T-shaped portion 151 for engaging the scroll carried in socket 97. Socket 97 is provided with a slot 101 as can be seen in FIG. 6. Slot 101 receives the T-portion 151 of piston 132 during transfer as the width of T-portion 151 is wider than the diameter of the scroll socket 97 so as to ensure that the T-portion 151 extends across and engages the entire scroll so as to ensure proper transfer.

As previously noted the free end of the scroll has been secured to a spool so that the transfer of the scroll and spool must be carried out simultaneously.

Upon proper signal initiated by the cam drive, air cylinder 128 will be actuated so as to move piston 127 in the direction of arrow F. This will cause pivoting of lever 122' about pivot point 122" so that U-assembly 131 is moved in the direction of arrow E causing pistons 132 and 133 to enter sockets 97 and 96, respectively, on the turret 90 in order to transfer the scroll and spool carried therein respectively. The scroll and spool will be received in their respective chambers of the bottom portion 2 of the cartridge carried in the cartridge receiving socket of turret 112 for further operation as previously described.

From the foregoing it will be appreciated that a novel method and machine for winding a scroll of sensitized film with backing paper into a scroll and inserting that scroll into a cartridge, and fully assembling and sealing the cartridge has been devised which is both simple in structure and operation requiring a minimum number of operators and providing trouble free operation. It has been found in practice that an apparatus according to the present invention operates at sufficiently high speeds for producing as many as three thousand completed cartridges during a normal working shift.

While the invention has been described and illustrated with respect to a certain preferred embodiment which gives satisfactory results, it will be understood by those skilled in the art, after understanding the purpose of the invention, that various other changes and modifications may be made without departing from the spirit and scope of the invention.

I claim:

1. A method of assembling and loading a film cartridge having a bottom portion and a cover for assembly theretogether with a take-up spool and scroll formed of unattached film interleaved with backing paper comprising the steps of:
    supplying a web of sensitized film and a web of backing paper in overlying relation to a scrolling station;
    severing said webs of film and paper to desired finite lengths;
    winding said film and backing paper into a scroll in which the ends of said film and paper are unattached to each other;
    attaching a free end of scrolled paper to a take-up spool;
    inserting said scroll and take-up spool simultaneously into a scroll chamber and spool chamber of said bottom portion by movement of said scroll and spool axially thereinto;
    assemblying said bottom portion with said cover to form the cartridge assembly enclosing said spool and scroll within said chambers; and
    sealing said cover to said bottom portion in a light tight manner.

2. The method according to claim 1 further comprising the step of detecting the position of said webs with respect to said scrolling station for initiating said severing operation.

3. The method according to claim 1 further comprising the step of supporting said webs of film and paper on a guide track and advancing said webs therealong to said scrolling station.

4. The method according to claim 1 further comprising the step of forming a loop in said web of paper for relieving tension therein, and detecting the size of said loop.

5. The method according to claim 1 wherein said winding of said scroll comprises the steps of inserting one end of said paper web into a slot on a winding spindle, rotating said spindle at high speed to wind said webs thereabout, and withdrawing said spindle from the wound scroll so as to deposit said scroll in a scroll receiving socket of a first transport carrier.

6. The method according to claim 5 further comprising the steps of feeding a take-up spool into a further socket in said first transport carrier, indexing said first transport carrier to an operating station for attaching said free end of said scroll to said spool.

7. The method according to claim 6 further comprising the steps of feeding a cartridge bottom into a second transport carrier, indexing said second transport carrier to a loading station, transferring said spool and scroll from said first transport carrier, indexing said second transport carrier to an assembly station for assembly with said cover, advancing said second transport carrier to a welding station for sealing said cover to said bottom portion, and ejecting said cartridge from said second carrier.

8. The method according to claim 6 wherein said free end of said scroll is attached to said take-up spool by ultrasonic means.

9. The method according to claim 7 wherein said cover is sealed to said bottom portion by ultrasonic welding.

10. The method according to claim 5 further comprising the steps of rotating said spindle at slow speed prior to insertion of said web in said slot, detecting the orientation of said slot, and stopping said slow speed rotation when said slot is properly oriented for receiving said webs from said guide track.

11. The method according to claim 10 further comprising the steps of pivoting a portion of said guide track so as to aim said webs at said slot.

12. A machine for assemblying a film cartridge having a double chambered bottom portion and a cover and for loading a scroll formed by a length of film interleaved with a length of backing paper, said film and backing paper being unattached to each other, and a take-up spool into said chambers comprising:
  a housing;
  a supply of sensitized film and a supply of backing paper;
  a single guide track supported on said housing for receiving and transporting therein a web of film with a web of backing paper to a scrolling means;
  means for guiding a web of film from the supply thereof into said guide track, and means for guiding a web of backing paper from the supply thereof into said guide track;
  means supported on said housing for engaging said web of film and means for engaging said web of paper to advance said webs along said guide track;
  means for severing said film and paper webs to desired finite lengths;
  means for determining relative locations of said webs to actuate said severing means;
  scrolling means carried on said housing at one end of said guide track for winding said severed webs into a scroll, said webs being unattached to each other, means for attaching a free end of said scroll to a take-up spool;
  means for axially displacing said spool and scroll for simultaneously inserting said spool and scroll into a spool chamber and a scroll chamber respectively in said bottom portion of said cartridge;
  transport means for carrying said loaded bottom portion to an assembly station for assembly with said cover; and
  means for sealing said cover to said bottom portion to form a completed cartridge.

13. The machine according to claim 12 wherein said means for guiding said film web to said guide track comprises a plurality of rollers mounted for rotation in fixed position on said housing, and a spring loaded floating roller for maintaining desired tension in said film web.

14. The machine according to claim 13 further comprising means connected to said floating roller for detecting the position thereof as an indication of film tension, and means connected to said detecting means and actuated thereby for correcting said tension.

15. The machine according to claim 12 wherein said means for guiding said backing paper to said guide track comprises means to form a loop in said web between said supply and said guide track, and means mounted on said housing for detecting the size of said loop.

16. The machine according to claim 15 wherein said means for detecting the size of said loop comprises a light emitting element directing a beam of light in the path of said loop and a light detecting element for receiving said beam when said loop is too short, and further comprising means for advancing said paper web from said supply to said loop in response to a signal from said light detecting element in order to adjust the size of said loop.

17. The machine according to claim 13 wherein said means for advancing a desired length of film web along said guide track comprises a sprocket wheel rotatably carried on a sprocket shaft, and a rotatably driven rubber covered pinch roller in surface engagement with said sprocket wheel forming a nip therebetween for drawing said film web therethrough when said pinch roller is driven, so that when said sprocket wheel is caused to make a single revolution the desired length of film will have been metered into said guide track.

18. The machine according to claim 17 wherein the means for determining the location of said film web to actuate the means for severing said film web comprises cam means carried on said sprocket shaft, and switch means actuated by said cam means so as to indicate that the desired length of film has been metered into said track.

19. The machine according to claim 12 wherein said means for determining the location of said paper web to actuate the means for severing said paper web comprises a light emitting and detecting element mounted on the housing and directing a beam of light onto a light reflecting surface portion of said guide track, so that when a portion of said paper passes said element a signal will be produced to actuate said severing means.

20. The machine according to claim 12 wherein said scrolling means comprises a quill housing carried on said machine housing, a quill journalled for rotation in said quill housing, a winding spindle carried within said quill for axial movement therethrough between an inactive position and a scrolling position, means for keying said spindle to said quill so that said spindle will rotate upon rotation of said quill, means coupled with said spindle for causing axial movement thereof, means coupled with said quill for causing rotation thereof when said spindle is in the scrolling position, a diametric slot in said spindle for receiving an end of said web of paper to form the center of said scroll, and means for actuating said means causing axial movement of the spindle.

21. The machine according to claim 20 wherein said means for causing axial movement of said spindle is an air cylinder, and wherein said means for causing rotation of said quill is an electric motor, further comprising switch means for initiating operation of said motor for rotating said scroll and spindle, and actuator means carried by said air cylinder for tripping said switch means.

22. The machine according to claim 21 further comprising a spindle plate carried for rotation with said quill, means carried by said spindle plate for indicating its angular orientation and the orientation of said diametric slot in said spindle, means for detecting the position of said indicating means for stopping operation of said motor so that said slot will be oriented in a position to receive said end of said paper web.

23. The machine according to claim 22 wherein said indicating means carried on said plate comprises a pair of diametrically opposed slots, and said detecting means comprises a light emitting and detecting element mounted for directing a beam of light transverse to the plane of said plate so as to be aligned with and detect the position of said slots.

24. The machine according to claim 12 wherein said free end of said paper is attached to said spool by ultrasonic means.

25. The machine according to claim 12 wherein said means for sealing said cover to said bottom portion of said cartridge is an ultrasonic welding device.

26. The machine according to claim 12 further comprising a first transport carrier having at least one set of sockets including a scroll socket and a spool socket for supporting therein a take-up spool, said scroll being wound within said scroll socket, said transport means comprising a second transport carrier having a plurality of cartridge sockets for supporting therein said bottom portion of said cartridge, means connected to said first and second transport carriers for synchronously indexing said sockets to a loading position, said inserting means comprising a transfer mechanism movably carried on said housing for transferring said spool and scroll in a direction parallel to the longitudinal axes of said spool and scroll simultaneously from their respective sockets in said first transport carrier into their respective chambers in said bottom portion of said cartridge supported in said second transport carrier, and means for indexing said second transport carrier to said assembly station.

27. The machine, according to claim 26 wherein each of said transport carriers comprises a turret journalled for rotational indexing in said housing, said sockets being located on a circumferential path of said turrets, said first and second turrets being axially offset and overlapping so that said spool and scroll sockets of said first turret will register with a cartridge socket of said second turret when said sockets are located at the loading position, said means for indexing said turrets comprising a Furgeson drive unit for each turret, said drive units being mechanically tied for synchronous indexing.

28. The machine according to claim 27 further comprising a series of cam switch elements for actuating said scrolling operation, said inserting operation, said paper to spool attaching operation and said cover to bottom sealing operation in response 29. The machine according to claim 28 wherein said transfer mechanism comprises a lever pivotally mounted on said housing, a pair of transfer pistons carried on one end of said lever for engaging an end of said spool and scroll carried in their respective sockets of said first turret and axially displacing said spool and scroll from their respective sockets so as to transfer them to said cartridge bottom, drive means connected to the other end of said lever so as to cause pivoting movement thereof for driving said pistons into engagement with the ends of said scroll and spool when said drive means is actuated in response to indexing of said turrets.

30. The machine according to claim 27 wherein said scrolling means comprises a winding spindle mounted for axial movement between an inactive position and a scrolling position in which said spindle extends into said scroll socket of said first turret for winding said webs of paper and film into a scroll, means connected to said spindle for causing, rotation thereof to wind said scroll, means coupled to said spindle for axially moving said spindle into said socket to the scrolling position and for withdrawing said spindle from said scroll socket to the inactive position, means for retaining the wound scroll within said scroll socket when said spindle is withdrawn therefrom.

31. The machine according to claim 30 further comprising a guide track section mounted on said housing for pivotal movement about a pivot point, said guide track section communicating at one end thereof with said single guide track for receiving and transporting therethrough said web of film and web of backing paper, said scrolling means being located at the other end of said guide track section, and means carried on said housing connected to said guide track section for causing pivotal movement thereof so that said web of film and web of backing paper will be directed at said spindle for scrolling.

32. The machine according to claim 31 wherein said means for causing pivotal movement of said guide track section is an air cylinder.

33. In a machine for winding a length of film with a length of backing paper so as to form a scroll with the ends of said film and paper being unattached to each other, and loading said scroll with a take-up spool into a film cartridge, the combination comprising a first rotatably supported transport carrier, a scroll receiving socket and a spool receiving socket in said first transport carrier, a winding spindle mounted for axial movement between an inactive position and a scrolling position in which said spindle extends into said scroll receiving socket for winding a scroll therein, means coupled to said spindle for causing axial movement thereof, a diametric slot in said spindle for receiving said web of paper, means for supplying and feeding desired lengths of film and backing paper in overlying relation to said spindle, means connected to said spindle for causing rotation thereof to wind said film and paper into a scroll within said scroll receiving socket, an annular flange for retaining said scroll within said scroll receiving socket when said spindle is moved from the scrolling position to the inactive position, a second transport carrier arranged for rotation in a plane spaced from the plane of rotation of said first transport carrier and about an axis of rotation parallel to the axis of rotation of said first transport carrier so that a portion of said first and second transport carriers overlap, said second transport carrier arranged for supporting therein an open cartridge bottom, indexing means connected to said first and second transport carriers for synchronously moving said carriers so that said scroll and spool receiving sockets in said first carrier register with said cartridge bottom carried in the second carrier, and a transfer mechanism having means for engaging one end of said spool and scroll and displacing said spool and scroll in an axial direction for transferring them from their respective sockets to said open cartridge.

34. In a machine according to claim 33 further comprising a pivotally mounted guide track for guiding said film and backing paper into said scroll receiving socket, and means connected to said guide track for causing pivotal movement thereof so as to aim said paper into said slot of said spindle when said spindle is in the scrolling position.

35. In a machine according to claim 33 further comprising switch means actuated when said spindle is in said scrolling position to prevent indexing movement of said carriers.

36. In a machine according to claim 33 further comprising ultrasonic means for attaching a free end of said paper when wound with said film into a scroll to said spool.

37. In a machine according to claim 33 further comprising an ultrasonic welding mechanism for sealing a cover to said open cartridge bottom.

38. In a machine according to claim 33 further comprising means for detecting the orientation of said spindle slot so that said slot will be in the proper orientation for receiving said paper when said spindle is in said scrolling position.

39. In a machine according to claim 38 wherein said means for detecting the orientation of said spindle slot comprises a spindle plate carried for rotation with said spindle, a pair of diametrically opposed slots in said plates, a light emitting and detecting element mounted for directing a beam of light transverse to the plane of said plate so as to be aligned with and detect the position of said slots, and means connected to said element for deactuating the means for rotating said spindle so that said slots will be in the desired orientation.

40. In a machine according to claim 33 further comprising means for supplying said film and backing paper in web form, and means for severing said webs of film and backing paper into the desired lengths for scrolling.

41. In a machine according to claim 33 wherein said transfer mechanism comprises a pivotally mounted lever, a pair of transfer pistons carried on one end of said lever for engaging the ends of said spool and scroll carried in their respective sockets of said first transport carrier and for axially displacing said spool and scroll to effect transfer thereof to said cartridge bottom, drive means connected to the other end of said lever so as to cause pivotal movement thereof and for driving said pistons into engagement with said scroll and spool when said drive means is actuated in response to indexing of said first and second transport carriers.

* * * * *